United States Patent
Yoshida

(10) Patent No.: US 8,438,614 B2
(45) Date of Patent: May 7, 2013

(54) COMMUNICATION SYSTEM, RELAY APPARATUS, TERMINAL APPARATUS AND COMPUTER READABLE MEDIUM

(75) Inventor: Takeo Yoshida, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 880 days.

(21) Appl. No.: 12/555,266

(22) Filed: Sep. 8, 2009

(65) Prior Publication Data

US 2010/0211995 A1     Aug. 19, 2010

(30) Foreign Application Priority Data

Feb. 13, 2009    (JP) ................................ 2009-032037

(51) Int. Cl.
     *G06F 7/04*      (2006.01)
(52) U.S. Cl.
     USPC ............................................................ 726/4
(58) Field of Classification Search ........................ None
See application file for complete search history.

(56) References Cited

U.S. PATENT DOCUMENTS

2001/0054157 A1*   12/2001   Fukumoto ..................... 713/201

FOREIGN PATENT DOCUMENTS

JP     2008-227805 A     9/2008

* cited by examiner

*Primary Examiner* — Brandon Hoffman
(74) *Attorney, Agent, or Firm* — Sughrue Mion, PLLC

(57) ABSTRACT

Authentication information for each communication destination and communication condition information are stored so as to be associated with each other in accordance with each communication destination designated by a request accepted by a server apparatus. Communication permission information containing authentication information of the communication destination is accepted from a requester. Communication condition information associated with authentication information contained in the accepted communication permission information is acquired. Determination is made as to whether or not communication requested by the requester is consistent with a condition indicated by the acquired communication condition information. When determination is made that the communication requested by the requester is consistent with the condition indicated by the acquired communication condition information, the communication from the requester is relayed to the requested communication destination via a virtual service private line which is set in advance.

6 Claims, 8 Drawing Sheets

FIG. 5

| SERVICE NAME | | COMMUNICATION CONDITION |
|---|---|---|
| PREFIX | SUFFIX | |
| aaaa | $u_1$ | (1) Convert xxxx of a virtual URL into yyyy<br>(2) Allow only yyyy/?cgi? to be accessed |
| aaaa | $u_2$ | (1) Convert xxxx of a virtual URL into zzzz<br>(2) Allow zzz... to be accessed if load is not larger than a threshold value Th |
| ... | ... | ... |

| SERVICE NAME PREFIX | ADDRESS OF RELAY APPARATUS |
|---|---|
| aaaa | 192. ⋯⋯ |
| bbbb | 192. ⋯⋯ |
| ⋮ | ⋮ |

COMMUNICATION SYSTEM, RELAY APPARATUS, TERMINAL APPARATUS AND COMPUTER READABLE MEDIUM

CROSS-REFERENCE TO RELATED APPLICATIONS

This application is based on and claims priority under 35 USC 119 from Japanese Patent Application No. 2009-032037 filed on Feb. 13, 2009.

BACKGROUND

Technical Field

The present invention relates to a communication system, a relay apparatus, a terminal apparatus and a computer readable medium.

SUMMARY

According to an aspect of the invention, a communication system includes a terminal apparatus, a relay apparatus, an authentication apparatus and a server apparatus. The server apparatus accepts communication to at least one communication destination and provides a service determined for each communication destination. The terminal apparatus accepts and stores communication permission information in accordance with each communication destination in the server apparatus from the authentication apparatus with the communication permission information containing authentication information of the communication destination and key information of the relay apparatus, the communication destination and the terminal apparatus, accepts a communication request with respect to any communication destination, and transmits communication permission information defined correspondingly to the communication destination with respect to the communication request to the relay apparatus to thereby request the relay apparatus to perform communication. And the relay apparatus refers to authentication information of the communication destination contained in the communication permission information provided by the terminal apparatus, acquires communication condition information defined in advance to be associated with the referred authentication information of the communication destination, determines whether communication from the terminal apparatus is consistent with the acquired condition or not, and replies to the request given from the terminal apparatus and relays communication between the communication destination requested by the terminal apparatus and the terminal apparatus via a virtual service private line set in advance when communication from the terminal apparatus is consistent with the acquired condition.

BRIEF DESCRIPTION OF THE DRAWINGS

Exemplary embodiment(s) of the present invention will be described in detail based on the following figures, wherein:

FIG. 5 is an explanatory view showing an example of communication condition information held in the relay apparatus according to the exemplary embodiment of the invention;

DETAILED DESCRIPTION

Figure 1:
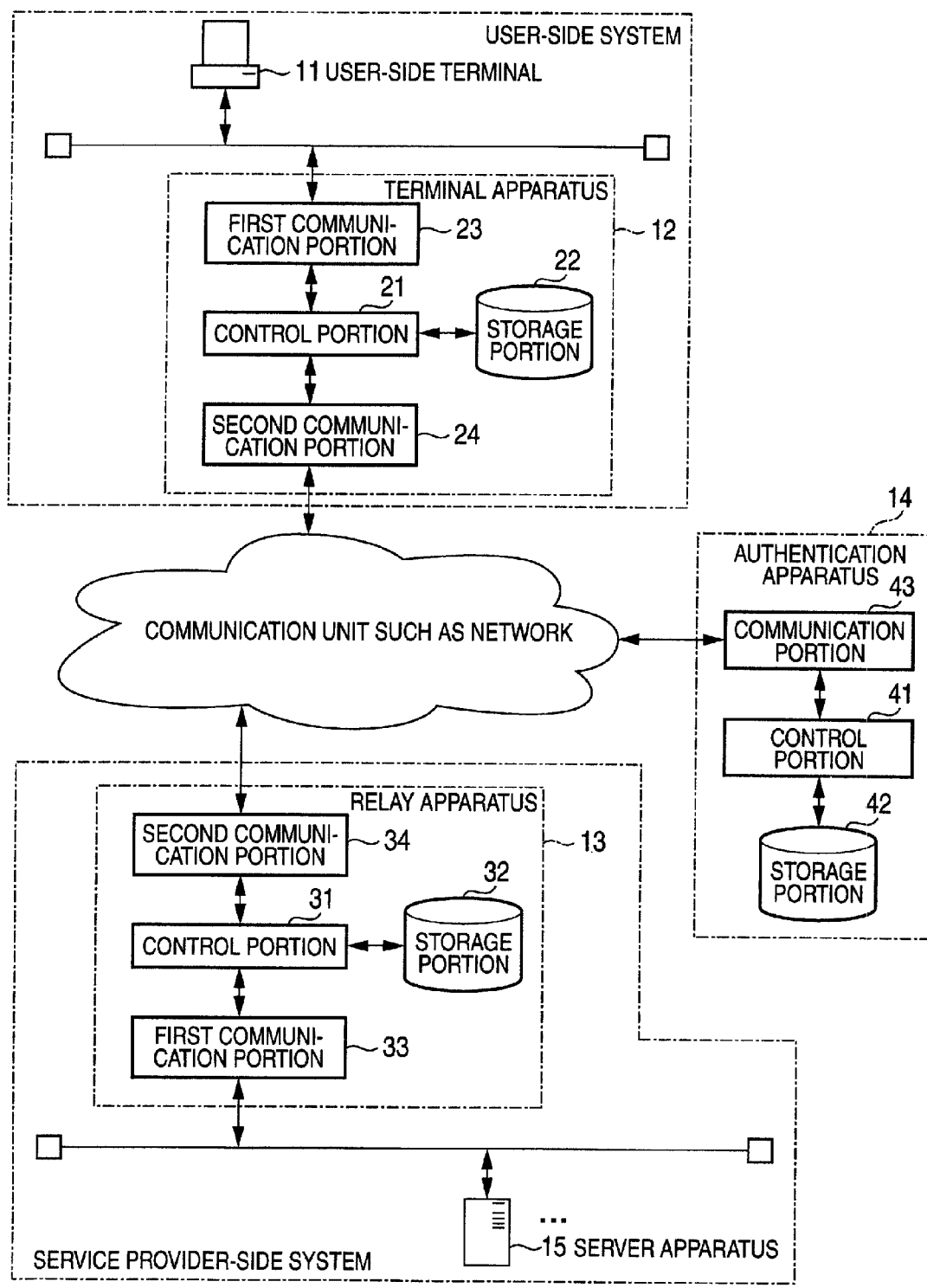
FIG. 1 is a block diagram showing an example of configuration of a communication system according to an exemplary embodiment of the invention.

An exemplary embodiment of the invention will be described below with reference to the drawings. As shown in FIG. 1, a communication system 1 according to the exemplary embodiment of the invention includes a user-side terminal 11, a terminal apparatus 12, a relay apparatus 13, an authentication apparatus 14, and an application server 15. The terminal apparatus 12, the relay apparatus 13 and the authentication apparatus 14 are connected to one another via a communication unit such as a network. The user-side terminal 11 and the terminal apparatus 12 are disposed in a user-side system and connected to each other via a communication unit such as a local network. The relay apparatus 13 and the application server 15 are disposed in a service provider-side system and connected to each other via a communication unit such as a local network.

As shown in FIG. 1, the terminal apparatus 12 includes a control portion 21, a storage portion 22, a first communication portion 23, and a second communication portion 24. The relay apparatus 13 includes a control portion 31, a storage portion 32, a first communication portion 33, and a second communication portion 34. The authentication apparatus 14 includes a control portion 41, a storage portion 42, and a communication portion 43.

Figure 2:
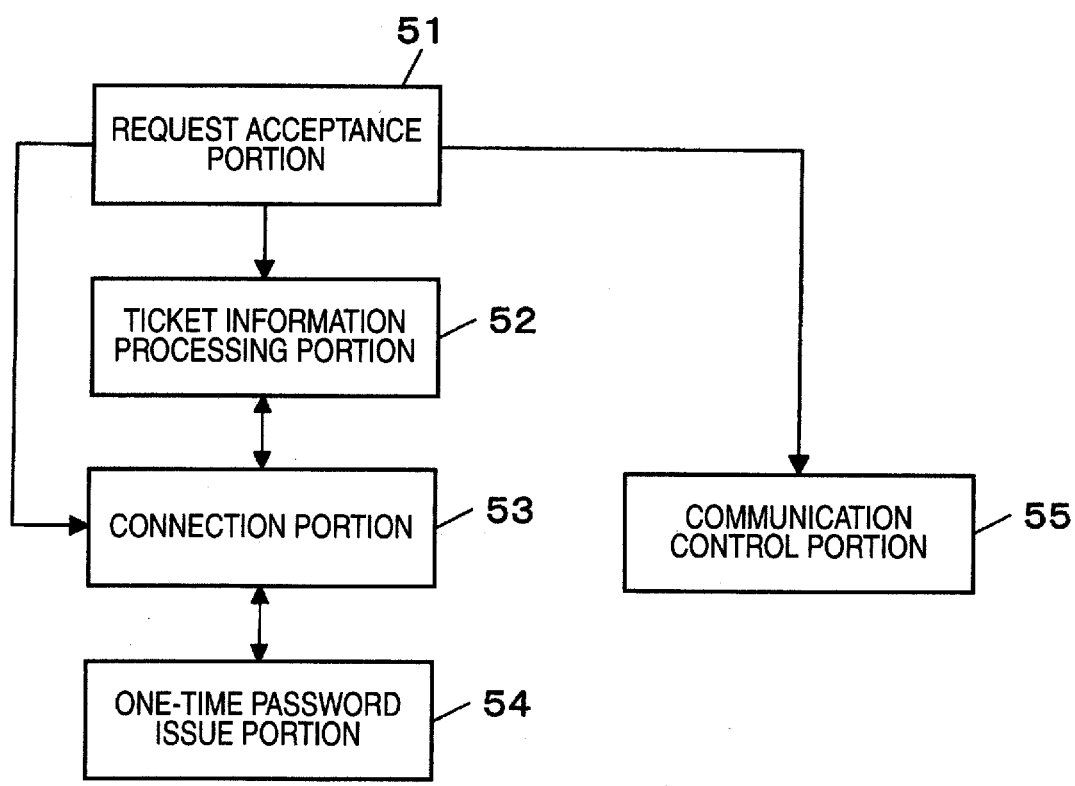
FIG. 2 is a functional block diagram showing an example of a terminal apparatus according to the exemplary embodiment of the invention.

The control portion 21 of the terminal apparatus 12 is a program control device such as a CPU (Central Processing Unit) which operates in accordance with a program stored in the storage portion 22. In this exemplary embodiment, as shown in FIG. 2, the control portion 21 functionally includes a request acceptance portion 51, a ticket information processing portion 52, a connection portion 53, a one-time password issue portion 54, and a communication control portion 55, when the control portion 21 executes a program.

The request acceptance portion 51 accepts a communication request to the application server 15 from the user-side terminal 11. The communication request contains information of an address concerned with a service which the user-side terminal 11 wants to use, such as a virtual URL (Uniform Resource Locator) of the service, as an example of information for specifying a service (communication destination) provided by the application server 15. The virtual URL of the service is reference information which is provided by the relay apparatus 13 so as to correspond to an address indicating a destination of transmission of information concerned with the service request, so that a DNS (Domain Name Service) on a network does not perform address solution but the relay apparatus 13 uses exclusively virtual URL of the service as information for identifying the service of the application server 15 requested by the user. Accordingly, the virtual URL may contain a virtual domain name or a virtual host name. That is, in this example, even a top level domain may be virtual (may be the same as an existing domain or may be different from an existing domain). In this exemplary embodiment, the application server 15 may provide one service or may provide a plurality of services. In this case, communication destinations different in accordance with services to be provided (i.e. virtual URLs different in accordance with communication destinations, in view of the user side) are defined in advance, so that the service to be provided varies in accordance with the transmitted request inclusive of information as to which communication destination is specified based on designation of reference information corresponding to the communication destination.

Figure 3:
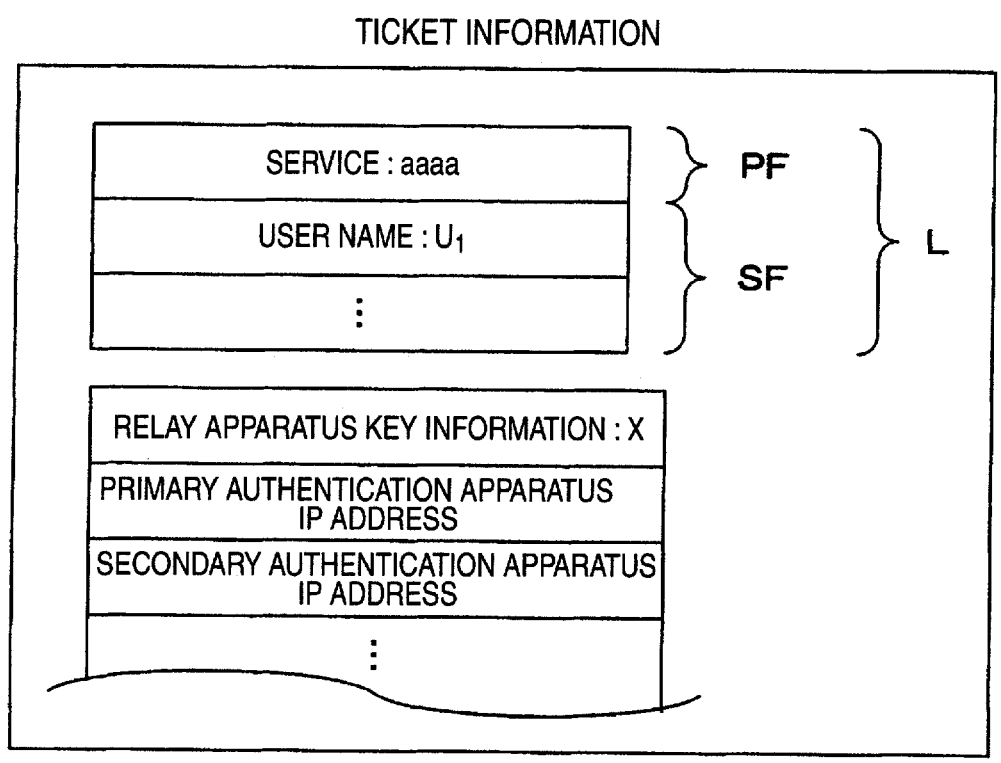
FIG. 3 is an explanatory view showing an example of ticket information as communication permission information used in the communication system according to the exemplary embodiment of the invention.

The ticket information processing portion 52 manages ticket information as communication permission information defined in accordance with each communication destination (i.e. in accordance with each service to be provided). Specifically as shown in FIG. 3, the ticket information contains log-in information L, key information X issued from the relay apparatus 13, and information AAA (which may be provided as pieces of information) for specifying the authentication apparatus 14. The key information X is information specific to the relay apparatus 13 and may contain information, such as an IP address of the relay apparatus 13, for specifying the relay apparatus 13. The ticket information may further contain information A (such as an IP address of the terminal apparatus 12) for specifying the terminal apparatus 12 using the ticket information. The log-in information L is a service name SN which contains information (prefix PF) for specifying a service as a communication destination, and information (suffix SF such as a user name, a password, etc.) necessary for the terminal apparatus 12 to log into the application server 15 providing the service. The log-in information L may be a hash value which is calculated based on the service name SN by a predetermined method. The information for specifying the authentication apparatus 14 may be information, such as a domain name address (or IP (Internet Protocol) address or the like) of the authentication apparatus 14, used at the time of communication with the authentication apparatus 14.

The ticket information processing portion 52 stores and holds ticket information issued from the authentication apparatus 14, in the storage portion 22 while associating the ticket information with the reference information provided by the relay apparatus 13 relative to the corresponding communication destination. The ticket information processing portion 52 reads, from the storage portion 22, ticket information corresponding to the reference information designated as a destination of information transmission by the communication control portion 55 in accordance with an instruction given from the communication control portion 55 and outputs the ticket information to the communication control portion 55.

The connection portion 53 sets a virtual private line between the terminal apparatus 12 and the relay apparatus 13. An example of the virtual private line is a communication path which is formed by encrypting, encapsulating and tunneling communication contents. An example of the communication path is a virtual private line called VPN (Virtual Private Network). In this exemplary embodiment, the virtual private line is however not limited to the VPN, so that any virtual private line may be used as long as communication of contents concealed by various methods can be performed via the virtual private line. The connection portion 53 sets the virtual private line at the time of powering on the terminal apparatus 12, breaking connection, etc.

Specifically, the connection portion 53 of the terminal apparatus 12 requests the authentication apparatus 14 to set a virtual private line to the relay apparatus 13 and make the terminal apparatus 12 log into the application server 15. That is, the connection portion 53 of the terminal apparatus 12 transmits an inquiry to the authentication apparatus 14. Ticket information or a hash value of ticket information is transmitted together with the inquiry. The ticket information contains key information X and a service name issued from the relay apparatus 13. The authentication apparatus 14 informs the terminal apparatus 12 of connection information of the optimal relay apparatus based on authentication from the terminal apparatus 12 and informs the relay apparatus 13 of the ticket information or its hash value and the IP address of the terminal apparatus 12. One and the same hash seed information HS, which is one and the same information as a source of authentication information, is distributed to the terminal apparatus 12 and the relay apparatus 13.

Upon reception of hash seed information HS from the authentication apparatus 14, the connection portion 53 outputs the hash seed information HS to the one-time password issue portion 54 to thereby make the one-time password issue portion 54 generate a one-time ID password (hereinafter referred to as one-time IDP) based on the hash seed information HS. The one-time IDP is used as information for connection authentication of a virtual private line to the relay apparatus 13 through the terminal apparatus 12. The one-time IDP is authenticated on the communication destination side, so that relay of communication between the communication destination and the terminal apparatus 12 can be started via the virtual private line preset by the replay apparatus 13. The operation of the relay apparatus 13 will be described later.

The one-time password issue portion 54 converts information received from the connection portion 53, by a predetermined algorithm in accordance with an instruction given from the connection portion 53 and outputs the converted information as a one-time IDP.

The communication control portion 55 requests the relay apparatus 13 via the virtual private line set so that communication is relayed to a communication destination specified by reference information, etc. accepted by the request acceptance portion 51. When the relay apparatus 13 starts relaying, the communication control portion 55 receives a response from the communication destination to which the relay apparatus 13 relays communication via the virtual private line, and the communication control portion 55 outputs the received response to the user-side terminal 11 which is a requester to the request acceptance portion 51. In this exemplary embodiment, the path of the communication performed through the relay apparatus 13 is hereinafter referred to as 'virtual service private line' because a virtual private line is set in accordance with each service identified based on reference information, etc., that is, the same condition as a so-called virtual private line set correspondingly to each service is obtained. A detailed operation of the control portion 21 inclusive of a specific operation of the communication control portion 55 will be described later.

The storage portion 22 is a storage device such as a memory device, a disk, etc. in which a program to be executed by the control portion 21 is stored. The program may be provided in a state in which the program is stored in a computer-readable storage medium such as a DVD-ROM (Digital Versatile Disc-Read Only Memory), so that the program can be copied to the storage portion 22. The storage portion 22 further operates as a work memory for the control portion 21.

The first communication portion 23 is a network interface, etc. which is connected to a communication unit such as a local network so that the first communication portion 23 can exchange information with the user-side terminal 11. The second communication portion 24 is also a network interface, etc. which is connected to a communication unit so that the second communication portion 24 can exchange information with the relay apparatus 13 and the authentication apparatus 14.

Figure 4:
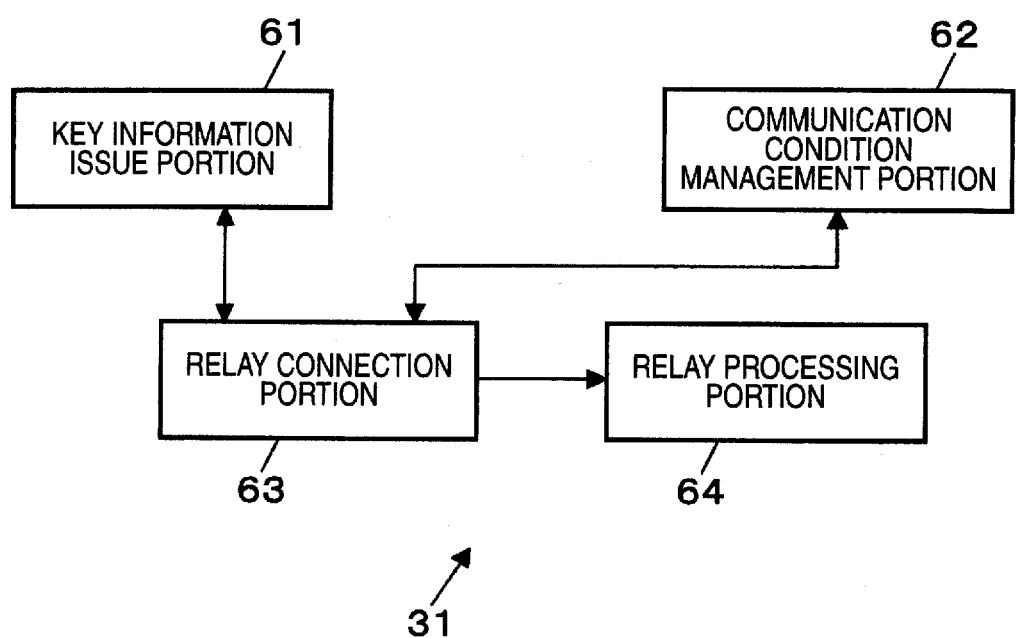
FIG. 4 is a functional block diagram showing an example of a relay apparatus according to the exemplary embodiment of the invention.

The control portion 31 of the relay apparatus 13 is a program control device such as a CPU (Central Processing Unit) which operates in accordance with a program stored in the storage portion 32. In this exemplary embodiment, as shown in FIG. 4, the control portion 31 functionally includes a key information issue portion 61, a communication condition management portion 62, a relay connection portion 63, and a relay processing portion 64, when the control portion 31 executes the program.

Upon reception of a key information request from the outside, the key information issue portion 61 issues key information X together with a service name, information for specifying the terminal apparatus 12 as a requester and information for specifying the authentication apparatus 14. The key information issue portion 61 obtains a hash value by hash-coding information containing the service name, the information A for specifying the terminal apparatus 12 as a requester, the information AAA for specifying the authentication apparatus 14 and the issued key information X by a predetermined method (e.g. the information to be hash-coded may be obtained by concatenating these pieces of information in a predetermined sequence). Then, the key information issue portion 61 outputs the hash value to the requester of the key information X.

As shown in FIG. 5, the communication condition management portion 62 holds communication condition information in the storage portion 32 so that a service name and a communication condition for a service specified by the service name are associated with each other by the communication condition information. The communication condition may be merely address information of a communication destination necessary for access from the relay apparatus 13 to the communication destination (The address information is referred to as 'real URL' in distinction from reference information such as a virtual URL designated by the terminal apparatus 12). Alternatively, the communication condition may be definition of processing to be executed when there is a communication request. As an example of the processing, there may be processing of acquiring information of load on the application server 15 and performing communication only for a real URL allowed to be designated as a communication destination in accordance with the acquired information. In this case, access to communication destinations specified by part of real URLs may be limited when the load on the application server 15 indicated by the acquired information is larger than a predetermined threshold value.

The processing designated by the communication condition may be concerned with processing in the relay apparatus 13 per se. For example, the relay apparatus 13 generally executes a plurality of relay processes concurrently in a time-sharing manner. Specifically, though processes are recorded on a queue in order of execution requests and executed in the request order, an accepted request may be pushed into the top (showing a request to be processed next) of the queue in accordance with some communication condition.

The relay connection portion 63 of the relay apparatus 13 in principle performs an operation of discarding information coming to the second communication portion 34. That is, in this exemplary embodiment, the second communication portion 34 is generally as if it did not exist because the second communication portion 34 in principle neither replies to communication nor replies to illegal attack. However, when information specifying at least the prefix PF and the suffix SF (which may be themselves or a hash result of them) in the ticket information comes from the authentication apparatus 14, the relay connection portion 63 exceptionally receives the information and starts an operation of setting a virtual private line.

Then, the relay connection portion 63 further receives hash seed information HS and information (such as an IP address of the terminal apparatus 12) specifying the terminal apparatus 12 as a partner with respect to the virtual private line from the authentication apparatus 14. For example, the hash seed information may be a random value.

The relay connection portion 63 waits for log-in exceptionally without discarding communication contents given from the terminal apparatus 12 specified by the thus received information. In addition, the relay connection portion 63 converts the hash seed information HS received from the authentication apparatus 14 by the same algorithm as used in the one-time password issue portion 54 of the terminal apparatus 12 and holds information obtained by the conversion as a comparison one-time IDP.

The relay connection portion 63 receives a one-time IDP generated based on the hash seed information HS as a log-in request from the terminal apparatus 12. Upon reception of the log-in request, the relay connection portion 63 compares the received one-time IDP with the comparison one-time IDP generated previously. When the received one-time IDP coincides with the comparison one-time IDP, the relay connection portion 63 regards log-in as being already permitted and sets a virtual private line between the relay apparatus 13 and the terminal apparatus 12 as a requester.

After setting of the virtual private line, the relay connection portion 63 further determines a process to be executed by referring to the communication condition information held in the communication condition management portion 62 with use of the prefix and suffix information based on the ticket information as a key. As described above, examples of the process are a process of determining whether a specific process request is permitted or not, a process of converting a virtual URL into a real URL (URL used for transmission to the application server 15 for actual communication), etc. in the service.

Upon reception of request information containing ticket information from the terminal apparatus 12 via the virtual private line, the relay processing portion 64 finds a corresponding service name by referring to the ticket information contained in the request information. On this occasion, because a service name (prefix) contained in the ticket information is hash-coded, the relay processing portion 64 compares the hash result of the service name (prefix) contained in the ticket information with the hash result of a service name (prefix) contained in communication condition information held in the communication condition management portion 62 and finds a service name based on coincidence between the hash results. The relay processing portion 64 executes a process determined to be executed correspondingly to the found service name by referring to communication condition information associated with the found service name.

This process example is an example to specify a service (e.g. a real URL of a service) as a communication destination from a requested service name and transmit a request received from the terminal apparatus 12 to the application server 15 corresponding to the real URL.

As another example of the process, after a service (e.g. a real URL of a service) is specified as a communication destination, the relay processing portion 64 may perform the following process. That is, as described above, the relay processing portion 64 acquires information of load on the application server 15 corresponding to the specified real URL and refers to information preset as real URL information allowed to be designated in accordance with the acquired load information. When the specified real URL is set to be allowed to be designated in accordance with the acquired load information, the relay processing portion 64 transmits the request received from the terminal apparatus 12 to the application server 15 corresponding to the real URL. When the specified real URL is not set to be allowed to be designated in accordance with the acquired load information, the relay processing portion 64 notifies the terminal apparatus 12 of error. Hence, there can be implemented a process of limiting access to communication destinations specified by part of real URLs when the load on the application server 15 indicated by the acquired information is larger than a predetermined threshold value.

In this manner, the relay processing portion 64 performs controlling so that only communication permitted in the terminal apparatus 12 based on the ticket information is relayed to the corresponding application server 15.

The relay processing portion 64 relays the request information received from the terminal apparatus 12 via the virtual private line, to the control portion 31 of the relay apparatus 13. In addition, the relay processing portion 64 controls only communication permitted in the terminal apparatus 12 based on the ticket information by the application server 15.

The storage portion 32 is a storage device such as a memory device, a disk, etc. which stores a program to be executed by the control portion 31. The program may be provided in a state in which the program is stored in a computer-readable storage medium such as a DVD-ROM (Digital Versatile Disc-Read Only Memory), so that the program can be copied to the storage portion 32. The storage portion 32 further operates as a work memory for the control portion 31. In this exemplary embodiment, the storage portion 32 further hold communication condition information as shown in FIG. 5.

The first communication portion 33 is a network interface, etc. which is connected so that the first communication portion 33 can exchange information with the application server 15 via a communication unit such as a local network. The second communication portion 34 is also connected so that the second communication portion 34 can exchange information with the terminal apparatus 12 and the authentication apparatus 14.

The control portion 41 of the authentication apparatus 14 is a program control device such as a CPU (Central Processing Unit) which operates in accordance with a program stored in the storage portion 42. In this exemplary embodiment, the control portion 41 of the authentication apparatus 14 executes a process of issuing ticket information in response to a ticket information issue request given from the terminal apparatus 12. The control portion 41 further executes a process of setting a virtual private line between the terminal apparatus 12 and the relay apparatus 13. Detailed contents of these processes will be described later.

Figures 6, 7:
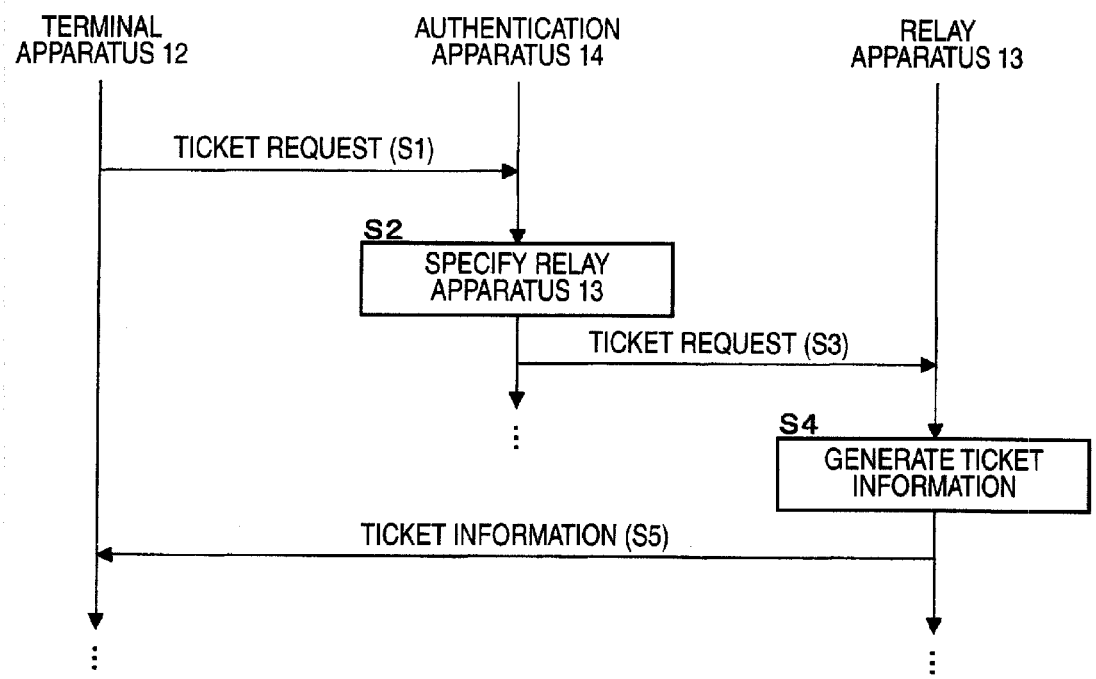
FIG. 6 is an explanatory view showing an example of information which is held in an authentication apparatus according to the exemplary embodiment of the invention and which is used for specifying the address of the relay apparatus.
FIG. 7 is a flow chart showing an example of pre-processing in the communication system according to the exemplary embodiment of the invention.

The storage portion 42 is a device such as a memory device, a disk device, etc. which stores a program to be executed by the control portion 41. The program may be provided in a state in which the program is stored in a computer-readable storage medium such as a DVD-ROM (Digital Versatile Disc-Read Only Memory), so that the program can be copied to the storage portion 42. The storage portion 42 further holds a table on which information of a service name predetermined in accordance with each service is associated with an address (IP address etc.) of the relay apparatus 13 which mediates communication to a communication destination to enjoy provision of each service (FIG. 6). The storage portion 42 further operates as a work memory for the control portion 41. The communication portion 43 is a network interface, etc. which is connected so that the communication portion 43 can exchange information with the terminal apparatus 12 and the relay apparatus 13.

[Pre-Processing]

The communication system according to this exemplary embodiment has the aforementioned configuration and operates as follows. First, preprocessing to be executed beforehand will be described. As shown in FIG. 7, pre-processing is performed among the terminal apparatus 12, the relay apparatus 13 and the authentication apparatus 14. First, the terminal apparatus 12 transmits a ticket information request containing information A for specifying the terminal apparatus 12 and information B for specifying a communication destination desired to be connected, to the authentication apparatus 14 (S1).

The communication destination specifying information contained in the ticket information request contains a prefix PF portion of a service name SN. The authentication apparatus 14 specifies the relay apparatus 13 capable of relaying communication with respect to a service specified by the prefix PF portion by referring to at least the prefix PF portion of the service name SN from information contained in the ticket information request (S2). Specifically, as shown in FIG. 6, the authentication apparatus 14 stores a table on which the prefix PF portion of the service name SN and information (such as an IP address of the relay apparatus 13) for specifying the relay apparatus 13 capable of relaying the service are associated with each other. Then, the authentication apparatus 14 specifies the relay apparatus 13 capable of relaying communication with respect to a service related to the ticket information request by referring to the table. A plurality of relay apparatuses 13 may be installed for the purpose of improving availability. In addition, a plurality of IP addresses for connecting the relay apparatus 13 may be provided.

The authentication apparatus 14 transmits the ticket information request together with the information A for specifying the terminal apparatus 12 as a ticket information requester to the relay apparatus 13 specified by the step S2 (S3). Upon acceptance of the ticket information request from the authentication apparatus 14, the relay apparatus 13 generates ticket information containing key information X, information AAA for specifying the authentication apparatus 14 as a requester, information A for specifying the terminal apparatus 12 and log-in information L containing a prefix PF and a suffix SF as information necessary for logging into the application server 15 providing the service (S4). Then, the relay apparatus 13 transmits the ticket information to the terminal apparatus 12 (S5). On this occasion, the relay apparatus 13 transmits information (such as address information of the relay apparatus 13 and information concerned with communication protocol etc.) for defining a method of connection between the terminal apparatus 12 and the relay apparatus 13 and a virtual URL of the service received from the relay apparatus 13 in advance, together with the ticket information, to the terminal apparatus 12. The terminal apparatus 12 holds the ticket information and the information for defining a connection method while associating the two pieces of information with the information (virtual URL) for specifying the corresponding communication destination (service).

Incidentally, for connection to the authentication apparatus 14, the terminal apparatus 12 may receive ticket information for connection to the authentication apparatus 14 from the authentication apparatus 14 and store the ticket information in advance.

[Communication Processing]

Figure 8:
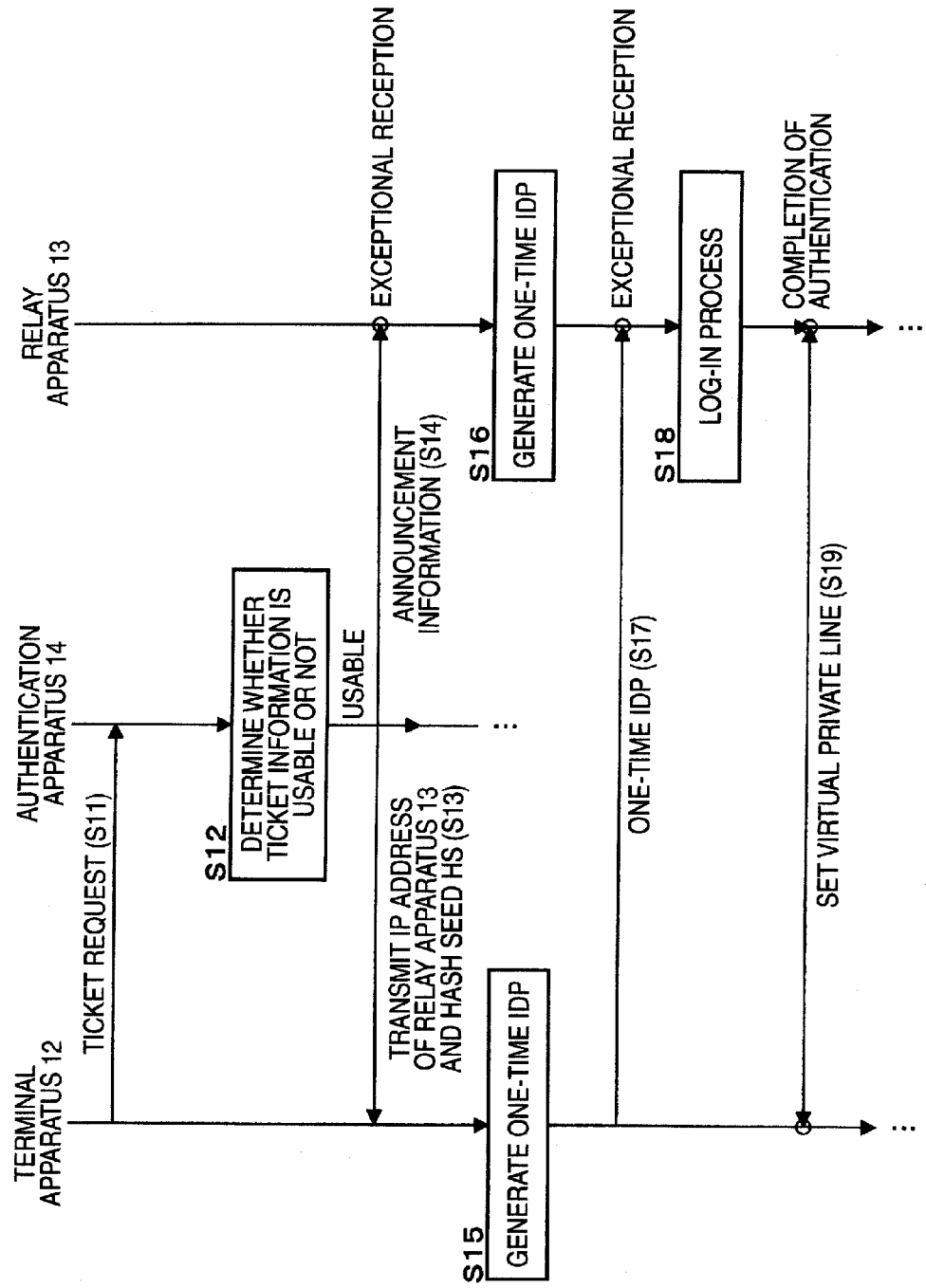
FIG. 8 is a flow chart showing an example of a first half of communication processing in the communication system according to the exemplary embodiment of the invention.
Figure 9:
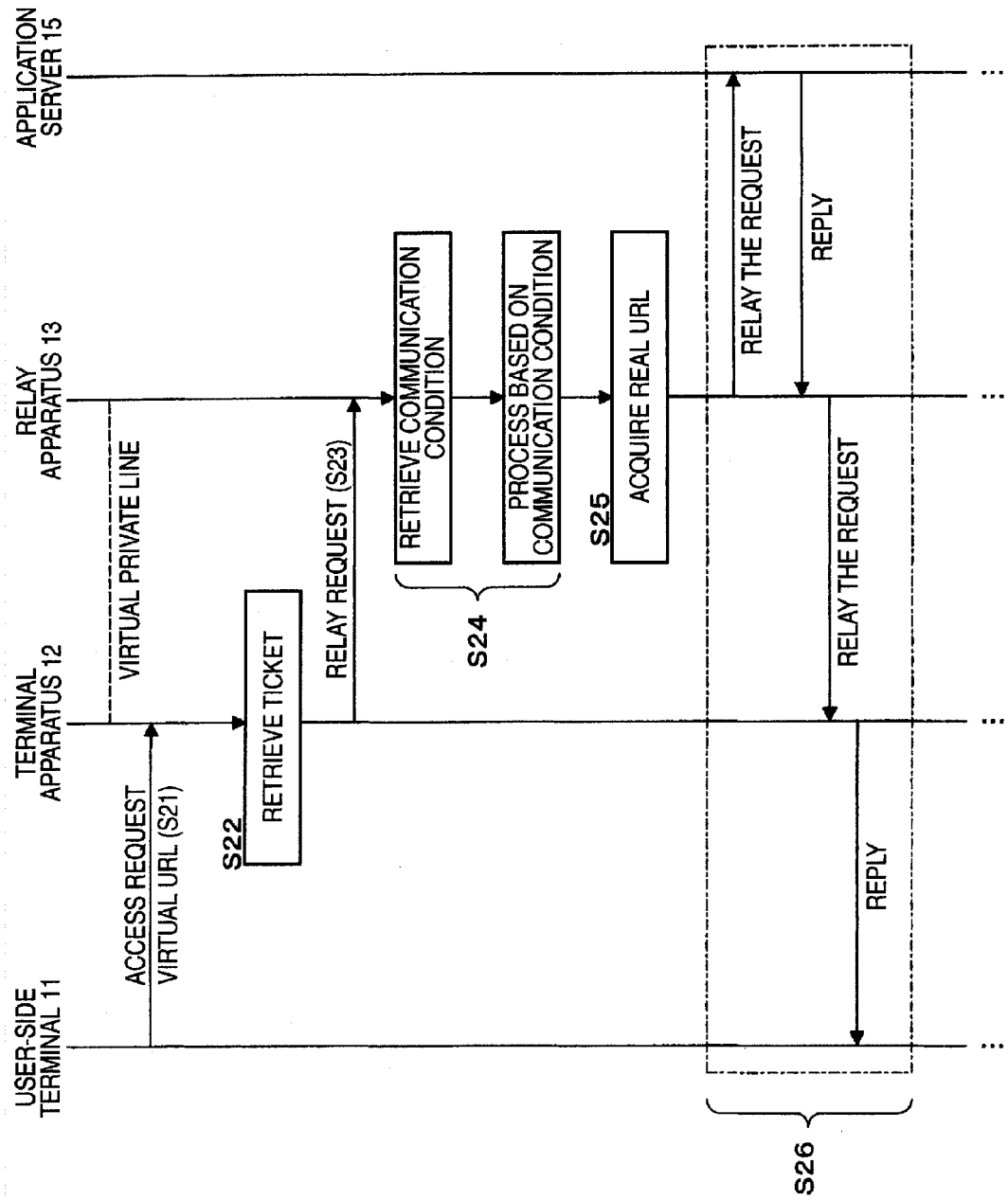
FIG. 9 is a flow chart showing an example of a second half of communication processing in the communication system according to the exemplary embodiment of the invention.

Communication between the user-side terminal 11 and the application server 15 providing a service in the communication system according to this exemplary embodiment will be described below with reference to FIGS. 8 and 9.

In this exemplary embodiment, a virtual private line between the terminal apparatus 12 and the relay apparatus 13 is set before the user-side terminal 11 issues a request. That is, after the terminal apparatus 12 is powered on or disconnected, the terminal apparatus 12 starts processing shown in FIG. 8 to transmit ticket information concerned with a service scheduled for communication to the authentication apparatus 14 (S11).

The authentication apparatus 14 refers to the received ticket information to thereby check whether the ticket information is usable or not (S12). Specifically, the authentication apparatus 14 may check whether or not the ticket information contains information AAA for specifying the authentication apparatus 14 per se. When the ticket information is not usable, the authentication apparatus 14 ignores the request. On the other hand, when determination is made that the ticket information is usable, the authentication apparatus 14 starts a process of setting a virtual private line between the terminal apparatus 12 and the relay apparatus 13, generates hash seed information HS as base information of authentication information and selects an IP address of the relay apparatus 13 capable of relaying a service related to the received ticket information. The selection may be performed as follows. When, for example, there are a plurality of IP addresses for relay apparatuses 13 capable of relaying the service related to the ticket information, a request is transmitted simultaneously to the IP addresses and the earliest IP address in terms of response to the request is selected. In this manner, an IP address lightest in processing load may be selected based on processing load on the relay apparatus 13 specified by each IP address.

The authentication apparatus 14 notifies the terminal apparatus 12 of the IP address of the selected relay apparatus 13 and the issued hash seed information HS (S13). The authentication apparatus 14 further transmits connection announcement information containing the IP address of the terminal apparatus 12 as a requester and the issued hash seed information HS to the IP address of the selected relay apparatus 13 (S14).

The transmission of the connection announcement information is equivalent to so-called port knocking. For reception of the port knocking, the relay apparatus 13 may construct a virtual private line (such as VPN) between the relay apparatus 13 and the authentication apparatus 14 in advance.

Each of the terminal apparatus 12 and the relay apparatus 13 generates a one-time IDP by a common process using the received hash seed information HS (S15, S16).

The terminal apparatus 12 stores the IP address notified by the authentication apparatus 14 while associating the IP address with the ticket information. The terminal apparatus 12 further transmits the generated one-time IDP to the IP address (i.e. to the relay apparatus 13) notified by the authentication apparatus 14 (S17). The relay apparatus 13 compares the one-time IDP transmitted from the terminal apparatus 12 with the one-time IDP generated by the relay apparatus 13 itself in the step S16 and performs a log-in process of the terminal apparatus 12 based on whether the one-time IDPs coincide with each other or not (S18). Assume now that authentication is completed when the one-time IDPs coincide with each other. Then, the relay apparatus 13 sets a virtual private line (which may be named 'virtual service private line' because it is a virtual private line for each service as will be described later) between the relay apparatus 13 and the terminal apparatus 12 (S19).

When the user of the user-side terminal 11 issues a service request while designating a virtual URL after that, the terminal apparatus 12 refers to ticket information and a connection method associated with the virtual URL and requests the relay apparatus 13 to relay the service request via the virtual private line beforehand set between the terminal apparatus 12 and the relay apparatus 13 (specified by the IP address associated with the ticket information) by the connection method.

A procedure by which the user of the user-side terminal 11 actually enjoys a service will be described below with reference to FIG. 9.

When the user of the user-side terminal 11 designates a virtual URL corresponding to a service to be enjoyed, the user-side terminal 11 transmits a request to the terminal apparatus 12 to gain access to the designated virtual URL (S21) The virtual URL may be a URL which does not exist really. Specifically, the virtual URL may be a name such as http://myapplicationfolder/groupware which is not settled by DNS (Domain Name Service).

Notification of such a virtual URL is beforehand sent to the user side in relation to a service. When this virtual URL is used, an eavesdropper cannot specify the application server 15 as a real communication destination even if he or she eavesdropped on communication of the user-side terminal 11.

The terminal apparatus 12 retrieves ticket information corresponding to the virtual URL related to the access request, information for defining the connection method and the IP address of the relay apparatus 13 relaying communication to the virtual URL (S22). When, for example, ticket information contains key information X, information AAA for specifying the authentication apparatus 14, information A for specifying the terminal apparatus 12 and log-in information L, the terminal apparatus 12 retrieves ticket information containing information A for specifying the terminal apparatus 12 itself in accordance with the designated communication destination. Even if a URL of a service not allowed to be used were designated on this occasion, the user could never enjoy the designated service because the terminal apparatus 12 can neither find any corresponding ticket information nor any information for defining a connection method so that the following communication cannot be performed.

On the other hand, when the terminal apparatus 12 finds ticket information and information for defining a connection method corresponding to the designated virtual URL, the terminal apparatus 12 starts communication to the relay apparatus 13 specified by the IP address found by the retrieval via the beforehand set virtual private line by the connection method defined by the found information and transmits a relay request containing the ticket information and the virtual URL designated by the user to the relay apparatus 13 (S23).

The relay apparatus 13 refers to the ticket information contained in the relay request, compares the service name (which may be hash-coded) contained in the ticket information with the service name (which may be hash-coded) beforehand held in the communication condition information and finds a service name in which the two pieces of information coincide with each other. The relay apparatus 13 refers to communication condition information associated with the found service name (S24) and converts the virtual URL contained in the request into a service (e.g. a real URL of a service) as a communication destination (S25). The real URL obtained as a result of the conversion may contain a port (a port number of TCP (Transfer Control Protocol)) to be used, log-in information (at least one part etc. of the log-in information L contained in the ticket information received from the terminal apparatus 12), etc. Specifically, the real URL may contain the IP address of the application server 15. In addition, conversion of an IPv6 address into an IPv4 address may be performed on this occasion. That is, a real URL corresponding to an IPv6 address designated as a virtual URL may be written as an IPv4 address.

Incidentally, when access to a service as a communication destination is disabled in accordance with the communication condition referred to in the step S24 (i.e. when communication from the terminal apparatus 12 cannot satisfy the communication condition referred to in the step S24), information indicating forbiddance of access is transmitted to the terminal apparatus 12.

When there is an individual executable rule designated as communication condition information, the relay apparatus 13 may determine a rule of gaining access to the application server 15 based on the rule or may perform a load sharing process or the like. The relay apparatus 13 transmits relay request information (designated virtual URL) from the terminal apparatus 12 to the real URL of the service (i.e. to the application server 15) and transmits information received from the application server 15 specified by the real URL to the terminal apparatus 12 (relay of communication: S26).

That is, the terminal apparatus 12 operates as if it were a proxy server for the user (user-side terminal 11). The relay apparatus 13 further operates as an access control proxy for the application server 15. By these operations, a virtual private line for each service provided by the application server 15 is set from the terminal apparatus 12 side. As described above, the virtual private line is set correspondingly to each service provided by the application server 15, unlike so-called VPN. More specifically, virtual private lines may be set respectively correspondingly to URLs different from one other or one virtual private line may be set correspondingly to a set of URLs so that access control (such as load-sharing control) is performed in its inside. Although such a virtual private line is called 'virtual service private line' in distinction from VPN, the communication relay process in the step S26 is equivalent to a communication process via the virtual service private line.

As described above, even when the user designates HTTP (Hyper Text Transfer Protocol) as a communication protocol at the time of inputting the virtual URL, another protocol (separately defined as a communication method) may be used between the terminal apparatus 12 and the relay apparatus 13.

[Connection Destination Change Processing]

In this exemplary embodiment, the terminal apparatus 12 transmits communication contents of a service provided by the application server 15 to the relay apparatus 13 via the virtual private line set between the terminal apparatus 12 and the relay apparatus 13 and receives information concerned with the service from the relay apparatus 13. Accordingly, even if the IP address etc. of the application server 15 were changed, the terminal apparatus 12 need not know contents of the change so that it is unnecessary to reissue any ticket.

That is, when the IP address of the application server 15 is changed, an administrator, etc. of the application server 15 can notify the relay apparatus 13 of the change. The relay apparatus 13 holds the IP address notified after the change while associating the IP address with the real URL of each service provided by the application server 15 notifying the relay apparatus 13. This information serves as information which is referred to in the step S25 in the communication processing shown in FIG. 9.

[Packet Monitor]

In this exemplary embodiment, the relay apparatus 13 performs reception/transmission of information after packetizing the information by a general network protocol. Therefore, when information satisfying a predetermined packet discarding condition is contained in information received from the terminal apparatus 12 or in a packet received from the application server 15, the relay apparatus 13 may discard the packet.

Examples of the packet discarding condition are a condition indicating information (such as an SQL sentence containing a single quotation) using SQL (language for access to a database) injection, a condition indicating information coincident with virus code containing a predetermined data pattern, etc.

[Communication Condition Information]

Although description has been made above in the case where the communication condition information used in the relay apparatus 13 is, for example, information for designating a URL of the application server 15 or information for selecting a URL allowed to be designated in accordance with the load on the application server 15, this exemplary embodiment is not limited thereto.

For example, the communication condition information may be information for defining a process to be executed at the time of communication. For example, the communication condition information may be information for limiting part of information allowed to request a service. Specifically, assume now that the URL of a certain service is http://aaaa.bbbb.cccc/cgi-bin/service. Assume further that schedule information is provided when a parameter "?schedule" is transmitted to the URL of the service. Assume further that address information is provided when another parameter "?address" is transmitted to the URL of the service. That is, assume that schedule information is provided for http://aaaa.bbbb.cccc/cgi-bin/service?schedule and address information is provided for http://aaaa.bbbb.cccc/cgi-bin/service?addresss. Then, the communication condition information may be information indicating a condition for permitting or denying communication in accordance with contents of the parameter.

That is, the relay apparatus 13 relays communication when a parameter portion (a portion after "?" in a CGI (Common Gateway Interface) command) as communication condition information is "schedule", and holds information for denying communication when the parameter portion is "address". In other words, when communication to a URL of http://aaaa.bbbb.cccc/cgi-bin/service?schedule is requested, the relay apparatus 13 relays the communication, but when communication to a URL of http://aaaa.bbbb.cccc/cgi-bin/service?address is requested, the relay apparatus 13 denies the communication.

[Example of Changing Connection Method Based on Key Information]

Although description has been made above in the case where communication between the terminal apparatus 12 and the relay apparatus 13 is always performed via the virtual private line, the invention is not limited thereto. For example, communication between the terminal apparatus 12 and the relay apparatus 13 may be performed in an ordinary routing manner. In this case, internal communication may be encrypted. When the communication form is changed in this manner, the relay apparatus 13 may notify the terminal apparatus 12 of which communication form should be used, by issuing key information X.

For example, when the key information X contains the IP address of the relay apparatus 13 and information for generating an encryption key for setting a virtual private line (i.e. information to be transmitted when a DH (Diffie-Hellman) key exchange method is used), setting of the virtual private line may be regarded as needed. For example, when the key information X contains the IP address of the relay apparatus 13 and a public key, communication may be regarded as being performed in an ordinary routing manner.

The terminal apparatus 12 refers to the key information X contained in the ticket information corresponding to the virtual URL designated by the user to thereby change the communication form in accordance with which of the two cases is used.

Description has been made above in the case where the user designates a virtual URL, the terminal apparatus 12 specifies a service corresponding to the virtual URL and transmits the designated virtual URL via the virtual private line beforehand set between the terminal apparatus 12 and the relay apparatus 13 relaying the specified service, and the relay apparatus 13 converts the virtual URL into a real URL and transmits the real URL to the application server 15. However, the user may designate a real URL in accordance with the level of security so that the relay apparatus 13 can transmit the real URL designated by the user to the application server 15 directly without conversion.

In addition, the terminal apparatus 12 in this exemplary embodiment may send an inquiry to the authentication apparatus 14 so repeatedly that the virtual URL of the service can be updated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication system comprising: a terminal apparatus; a relay apparatus; an authentication apparatus; and a server apparatus, wherein the server apparatus accepts communication to at least one communication destination and provides a service determined for each communication destination, the terminal apparatus accepts and stores communication permission information in accordance with each communication destination in the server apparatus from the authentication apparatus with the communication permission information containing authentication information of the communication destination and key information of the relay apparatus, the communication destination and the terminal apparatus, accepts a communication request with respect to any communication destination, and transmits communication permission information defined correspondingly to the communication destination with respect to the communication request to the relay apparatus to thereby request the relay apparatus to perform communication, the relay apparatus refers to authentication information of the communication destination contained in the communication permission information provided by the terminal apparatus, acquires communication condition information defined in advance to be associated with the referred authentication information of the communication destination, determines whether communication from the terminal apparatus is consistent with the acquired condition or not, and replies to the request given from the terminal apparatus and relays communication between the communication destination requested by the terminal apparatus and the terminal apparatus via a virtual service private line set in advance when communication from the terminal apparatus is consistent with the acquired condition;

the terminal apparatus accepts and stores the communication permission information and IP address of the relay apparatus from the authentication apparatus, and the terminal apparatus transmits the stored communication permission information to the relay apparatus having the stored IP address to request communication.

2. The communication system according to claim 1, wherein the key information of the relay apparatus comprises an address of the relay apparatus.

3. A terminal apparatus comprising:

an accepting unit that accepts a communication request from a user side in a state in which the communication request designates reference information provided by a relay apparatus in relation to any communication destination with respect to a request accepted by a server apparatus;

a storing unit that stores communication permission information in accordance with each communication destination in the server apparatus in a state in which the communication permission information contains reference information provided by the relay apparatus relative to the communication destination, authentication information of the communication destination and key information of the relay apparatus, the communication destination and the terminal apparatus;

a retrieving unit that retrieves the communication permission information corresponding to the reference information related to the accepted request;

a transmitting unit that transmits the communication permission information to thereby request the relay apparatus to relay communication between the terminal apparatus and the communication destination related to the request via a virtual service private line set in advance when the communication permission information corresponding to the reference information related to the accepted request is found by the retrieval, wherein the terminal apparatus accepts and stores the communication permission information and IP address of the relay apparatus from the authentication apparatus, and the terminal apparatus transmits the stored communication permission information to the relay apparatus having the stored IP address to request communication.

4. A communication system comprising: a terminal apparatus; a relay apparatus; an authentication apparatus; and a server apparatus, wherein:

the server apparatus accepts communication to at least one communication destination and provides a service determined for each communication destination, the terminal apparatus includes a storage unit which stores communication permission information in accordance with each communication destination in the server apparatus, a transmission unit which accepts a communication request with respect to any communication destination and transmits communication permission information defined correspondingly to the communication destination with respect to the communication request to the authentication apparatus, and a unit which receives information for specifying the relay apparatus and base information of authentication information from the authentication apparatus, generates authentication information based on the base information of authentication information and transmits the generated authentication information to the relay apparatus specified by the information, the authentication apparatus receives communication permission information from the terminal apparatus, determines whether the communication permission information is usable or not, and transmits information for specifying the relay apparatus capable of relaying communication to a communication destination corresponding to the communication permission information and base information of authentication information to the terminal apparatus and transmits the same base information of authentication information as that transmitted to the terminal apparatus and information for specifying the terminal apparatus to the relay apparatus specified by the information when determination is made that the communication permission information is usable, the relay apparatus includes a control unit which controls a communication unit so as not to reply to a communication request until base information of authentication information is received from the authentication apparatus, a generation unit which receives base information of authentication information and information for specifying the terminal apparatus from the authentication apparatus and generates authentication information in the same manner as the terminal apparatus based on the base information of authentication information, a comparison unit which accepts authentication information from the terminal apparatus specified by the information and compares the accepted authentication information with the authentication information generated by the generation unit, a setting unit which sets a virtual private line used for communication between the relay apparatus and the terminal apparatus when determination is made based on a result of the comparison that authentication is completed, and a relay unit which relays a request received from the terminal apparatus to the server apparatus and relays a response from the server apparatus to the terminal apparatus via the set virtual private line.

5. A non-transitory computer readable medium storing a program causing a computer to execute a process, the process comprising:

accepting a communication request from a user side in a state in which the communication request designates reference information provided by a relay apparatus in relation to any communication destination with respect to a request accepted by a server apparatus;

storing communication permission information in accordance with each communication destination in the server apparatus in a state in which the communication permission information contains reference information provided by the relay apparatus relative to the communication destination, authentication information of the communication destination and key information of the relay apparatus, the communication destination and the terminal apparatus;

retrieving the communication permission information corresponding to the reference information related to the accepted request;

transmitting the communication permission information to thereby request the relay apparatus to relay communication between the terminal apparatus and the communication destination related to the request via a virtual service private line set in advance when the communication permission information corresponding to the reference information related to the accepted request is found by the retrieval, accepting and storing the communication permission information and IP address of the relay apparatus from the authentication apparatus, and transmitting the stored communication permission information to the apparatus, having the stored IP address to request communication.

6. A non-transitory computer readable medium storing a program causing a computer to execute a process for a communication system, the computer being connected to a terminal apparatus, an authentication apparatus, and a server apparatus via a communication unit, the process comprising:

controlling the communication unit so as not to reply to a communication request until base information of authentication information is received from the authentication apparatus;

receiving base information of authentication information and information for specifying the terminal apparatus from the authentication apparatus and generating authentication information in the same manner as the terminal apparatus based on the base information of authentication information;

accepting authentication information from the terminal apparatus specified by the information and comparing the accepted authentication information with the generated authentication information;

setting a virtual private line used for communication between the relay apparatus and the terminal apparatus when determination is made based on a result of the comparison that authentication is completed; and relaying a request received from the terminal apparatus to the server apparatus and relays a response from the server apparatus to the terminal apparatus via the set virtual private line, wherein the accepted authentication information which is accepted from the terminal apparatus is information generated by the terminal apparatus based on the base information of authentication information received from the authentication apparatus.

* * * * *